July 10, 1951  H. H. MILLER  2,559,983
VACUUM CLEANER FOR MOTOR VEHICLES
Filed Nov. 20, 1946  2 Sheets-Sheet 1

Inventor
Howard H. Miller

By Clarence A. O'Brien
and Harvey B. Jacobson
Attorneys

July 10, 1951 H. H. MILLER 2,559,983
VACUUM CLEANER FOR MOTOR VEHICLES

Filed Nov. 20, 1946 2 Sheets-Sheet 2

Inventor
Howard H. Miller

By *Clarence A. O'Brien and Harvey B. Jacobson*
Attorneys

Patented July 10, 1951

2,559,983

UNITED STATES PATENT OFFICE 2,559,983

VACUUM CLEANER FOR MOTOR VEHICLES

Howard H. Miller, Havertown, Pa.

Application November 20, 1946, Serial No. 711,013

6 Claims. (Cl. 15—313)

The present invention relates to novel and useful improvements in vacuum cleaners for motor vehicles and more specifically pertains to a portable attachment for cleaning the interior of motor vehicles and the like by means of the suction taken from the intake manifold of an internal combustion engine.

The principal object of this invention resides in providing an attachment for connection with the intake manifold of an internal combustion engine which may be utilized to clean the interior of a motor vehicle.

An additional object of the invention resides in providing an apparatus in accordance with the foregoing object which shall be compact, of light weight, of durable construction and attractive in appearance, easily connected and removed from the intake manifold of an engine.

Other important objects of the invention reside in providing an attachment in accordance with the foregoing objects wherein the nozzle unit is formed upon and carried by a filtering unit for the purpose of filtering dirt and the like from the air drawn into the apparatus before said air is withdrawn into the intake manifold of an internal combustion engine.

Other subordinate objects reside in providing a device of the character above set forth which shall be composed of few parts, of inexpensive construction and yet which is particularly efficient for the purposes intended.

These, together with various ancillary objects of the invention which will later become apparent as the following description proceeds, are realized by this invention, one embodiment of which has been illustrated, by way of example only in the accompanying drawings, wherein.

Figure 1:
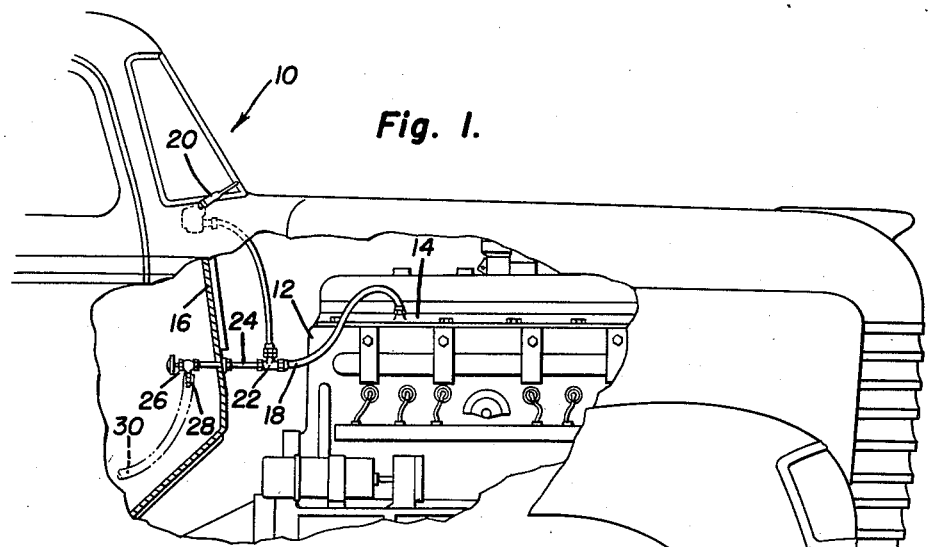
Figure 1 is a side elevational view of a portion of an automobile vehicle, parts being broken away, and illustrating the manner of connecting the device to the intake manifold of an internal combustion engine.

Referring now more particularly to the accompanying drawings, wherein like numerals indicate similar parts throughout the various views, 10 designates generally a portion of an automotive vehicle to which the invention has been applied, which vehicle includes an internal combustion engine power plant 12 having an intake manifold indicated generally at 14 and a dash 16 separating the engine compartment from the interior of vehicle body. In accordance with the dictates of this invention, the usual suction line 18 connecting the intake manifold 14 with a windshield wiper 20 is provided with a T coupling 22 from which extends a suction conduit 24 extending through the dash 16 and into the vehicle and provided at its outer end with a cut off valve 26 having a nipple 28 to which is detachably connected a flexible conduit 30.

This flexible conduit, which may be of any suitable length sufficient to obtain easy access to all parts of the vehicle interior, is connected with the improved nozzle and filtering unit 32 provided with a suitable handle 34 for affording portability to the device.

Figure 2:
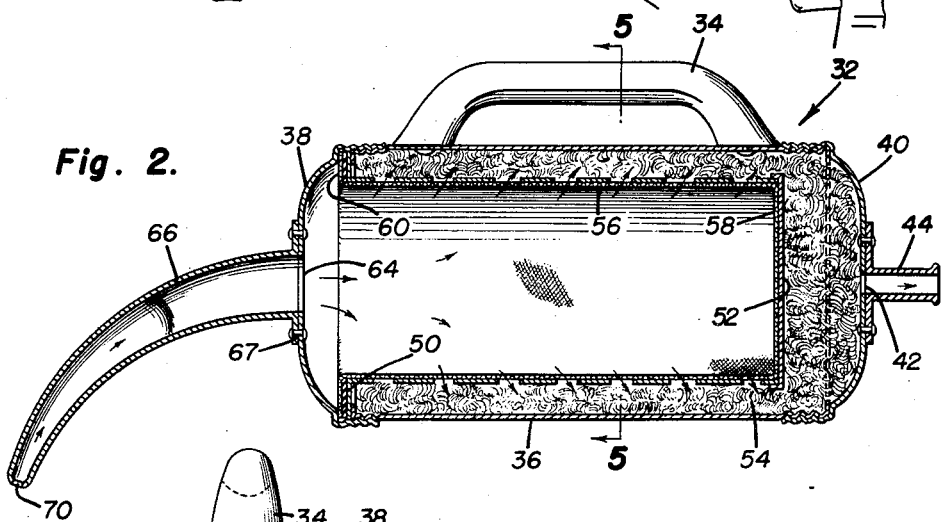
Figure 2 is a longitudinal vertical sectional view through the nozzle and filter unit of the invention.
Figure 3:
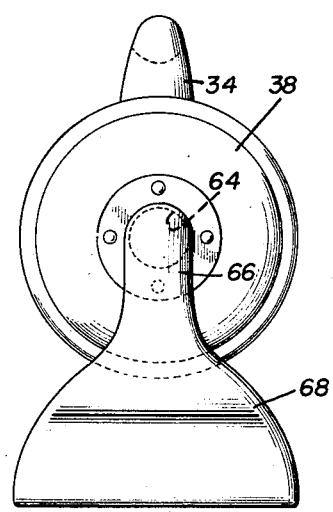
Figure 3 is a front end elevational view of the device shown in Figure 2.
Figure 4:
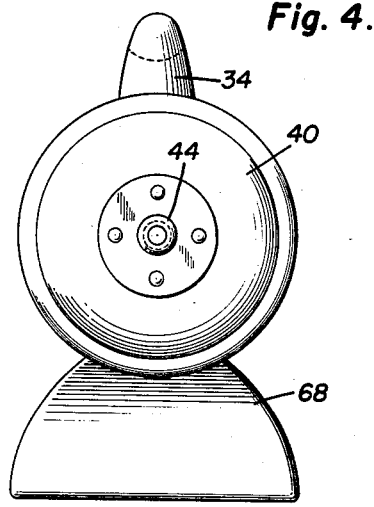
Figure 4 is a rear elevational view of the device shown in Figure 2.
Figure 5:
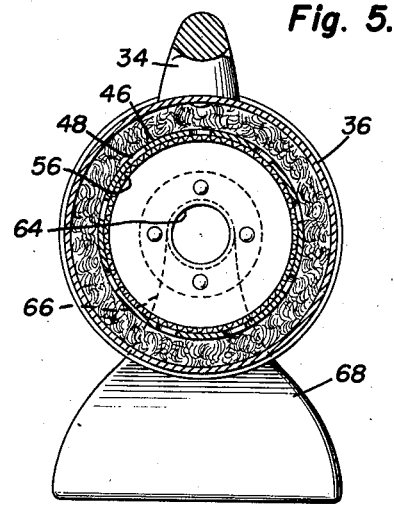
Figure 5 is a transverse vertical sectional view through the device, taken substantially upon the section line 5—5 of Figure 2.
Figure 6:
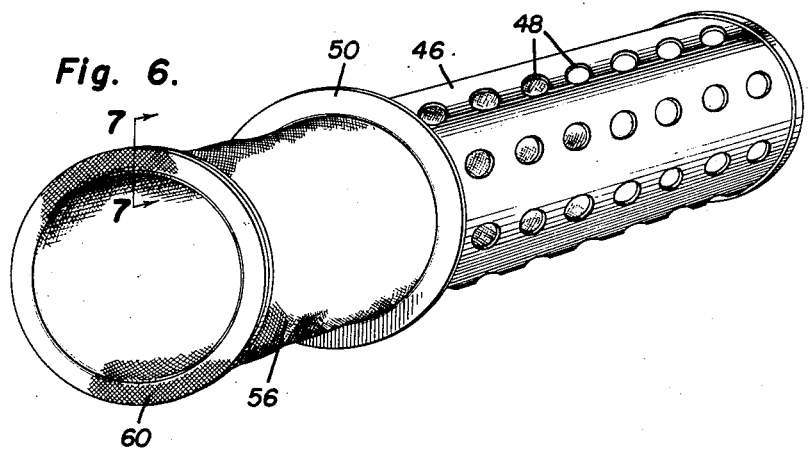
Figure 6 is an exploded or assembly perspective view of two components of the invention; and, Figure 7 is a fragmentary detail view taken in vertical section substantially upon the section line 7—7 of Figure 6.

For a better understanding of the internal construction of the filtering and nozzle unit 32, attention is now directed chiefly to Figures 2 and 6, wherein it will be seen that the unit consists of a cylindrical casing 36 having open ends and which are closed by detachable screw threaded end plates 38 and 40 which constitute air inlet and outlet means respectively. As shown in Figure 2, the handle 34 may be attached in any suitable manner to the exterior surface of the cylindrical casing to constitute a convenient carrying means for the unit when moving the same about the interior of a vehicle to perform the intended cleaning operation. The outlet closure member 40 is apertured as at 42 either centrally or eccentrically thereof as desired, and has rigidly connected therewith an outlet nipple 44 constituting a detachable connection for engagement by the flexible conduit 30.

A sleeve member 46 preferably of cylindrical shape and provided with a plurality of perforations 48 throughout its cylindrical surface, is detachably positioned within the cylindrical casing 36 in spaced relation to the cylindrical walls and closure cap thereof by means of an integral flange 50 formed at the open outer end of the sleeve member and adapted to seat upon and engage the open inlet end of the casing member 36. Although the sleeve member 46 has been shown as cylindrical in shape, it will be readily understood that any suitable configuration may be employed, and if desired a reticulated or foraminous screen may be provided as desired. At its opposite end, the sleeve 46 is closed as by a plate 52, for a purpose to be later set forth.

Figure 7:
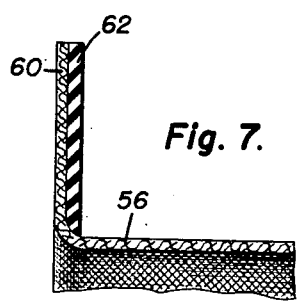

As shown in Figure 2 a mass of any suitable filtering material indicated at 54 is disposed in the annular space between the sleeve member 46 and the cylindrical casing 36, and is also positioned between the closure plate 52 and the outlet end cap 40. This filtering material may if desired be formed of steel wool, or other equivalent filtering medium. It may be here noted that the chief function of the sleeve 46 is to provide a retaining means for securing the filtering medium in position, and also to constitute a support for a filter bag 56 which is provided with a closed inner end 58 adapted to seat and engage upon the closure plate 52 of the sleeve 46, and with an open end having an annular flange 60 which may conveniently be formed or reinforced by a ring 62 of plastic, rubber, or the like as indicated in Figure 7.

In assembling the device it is intended that the flanges 60 and 62 shall overlie the flange 50 of the sleeve 46, and be retained thereon and seated therewith against the open inlet end of the casing 36 by means of the removable screw threaded cover plate 38. This cover plate is preferably provided with a central inlet orifice 64 and is adapted to receive a nozzle 66 as by any suitable fastening means 67.

As shown in Figures 2–5, the nozzle 66 consists of a tapering and downwardly curving tube of progressively diminishing height as it approaches its inlet end but correspondingly increasing width as clearly indicated in these figures. The nozzle 66 merges into an inlet suction head 68 having a generally rectangular inlet orifice 70 of any desired type.

From the foregoing it is believed that the manner of constructing and operating the device will be now apparent. When the flexible conduit 30 has been attached to the nipple 28 and the valve 26 opened, suction is applied by the conduit 18 and the conduit 24 from the intake manifold 14 to the nipple 44, which suction induces a flow of dust or dirt laden air through the inlet orifice 70 in the nozzle 66. The device may now be manipulated throughout the interior of the vehicle by use of the handle 34 in order to effectively clean the same. The inducted dirt laden air passing through the nozzle 66 and orifice 64 is discharged into the open end of the filter bag 56 which may be of any suitable closely woven material, and which is substantially impervious to the passage of dust but permits the ready flow of air therethrough. By this means, dust and dirt is separated from the entrained air and retained in the bag 56 while the air passes through the perforations 48 of the sleeve 46 and into the annular layer of filtering material 54. Since air cannot pass through the closed end of the bag and the end plate 52 of the sleeve 46, the air is necessarily drawn through the annular filtering medium 54 and passing the full length of the bag and underneath the closure plates 52, is inducted into the nipple 44 and thence into the conduit discharging into the intake manifold. By this means, air is compelled to enter the filtering medium throughout the area of the cylindrical surface of the filtering bag, and thus has a considerable path of travel before emerging from the nipple 44. During this travel, any solid impurities carried by the air which happens to pass through the filtering bag is removed by the passage through the filtering medium.

Since various embodiments of the foregoing invention will be readily apparent to those skilled in the art it is to be distinctly understood that the protection sought is not to be limited to the exact construction shown and described, but that all suitable modifications may be employed within the scope of the appended claims.

What is claimed as new is as follows:

1. A combined filter and nozzle unit for use with the intake manifold of an internal combustion engine in an automotive vehicle comprising; a cylindrical casing having inlet and exhaust openings at the ends thereof, a perforated sleeve within said casing and spaced from the walls and outlet end thereof, filtering material disposed between said sleeve and said casing and a nozzle opening into said sleeve, said sleeve having a flanged open end seating upon and secured to the inlet end of said casing, and a closed end adjacent but spaced from the outlet end of said casing, a fabric bag disposed inside said sleeve and in contact with the inside walls thereof, said bag having an open end, an annular flange on said open end, and means detachably securing said annular flange to said sleeve flange.

2. A combined filter and nozzle unit for use with the intake manifold of an internal combustion engine in an automotive vehicle comprising; a cylindrical casing having inlet and exhaust openings at the ends thereof, a perforated sleeve within said casing and spaced from the walls and outlet end thereof, filtering material disposed between said sleeve and said casing and a nozzle opening into said sleeve, said sleeve having a flanged open end seating upon and secured to the inlet end of said casing, a closed end adjacent but spaced from the outlet end of said casing, a fabric bag disposed inside said sleeve and in contact with the inside walls thereof, said bag having an open end, an annular flange on said open end and means detachably securing said annular flange to said sleeve flange, said last mentioned means comprising a cap screw threadedly engaging said casing and clamping both said flanges thereto.

3. A combined filter and nozzle unit for use with the intake manifold of an internal combustion engine in an automotive vehicle comprising; a cylindrical casing having inlet and exhaust openings at the ends thereof, a perforated sleeve within said casing spaced from the walls and outlet end thereof, filtering material disposed between said sleeve and said casing, a nozzle opening into said sleeve, said sleeve having a flanged open end seating upon and secured to the inlet end of said casing, and a closed end adjacent but spaced from the outlet end of said casing, a fabric bag disposed inside said sleeve and in contact with the inside walls thereof, said bag having an open end, an annular flange on said open end and means detachably securing said annular flange to said sleeve flange, said last mentioned means comprising a cap screw threadedly engaging said casing and clamping both said flanges thereto, said cap receiving said nozzle, said nozzle including a curved and tapered passage merging at the outer end with a rectangular air inlet orifice.

4. The combination of claim 1 wherein the filtering material disposed between the sleeve and the casing substantially fills the space therebetween.

5. The combination of claim 2 wherein the filtering material disposed between the sleeve and the casing substantially fills the space therebetween.

6. The combination of claim 3 wherein the filtering material disposed between the sleeve and the casing substantially fills the space therebetween.

HOWARD H. MILLER.

REFERENCES CITED

The following references are of record in the file of this patent:

UNITED STATES PATENTS

| Number | Name | Date |
| --- | --- | --- |
| 1,220,297 | Vanderhoof | Mar. 27, 1917 |
| 1,429,530 | Reeves | Sept. 19, 1922 |
| 1,516,548 | Ray | Nov. 25, 1924 |
| 1,797,557 | Stine | Mar. 24, 1931 |
| 1,801,966 | Maddocks | Apr. 21, 1931 |
| 1,898,410 | Wales | Feb. 21, 1933 |
| 2,145,049 | Heuberger | Jan. 24, 1939 |

FOREIGN PATENTS

| Number | Country | Date |
| --- | --- | --- |
| 129,866 | Switzerland | Jan. 2, 1929 |
| 537,840 | Germany | Nov. 7, 1931 |